United States Patent [19]

Pera

[11] 4,291,348
[45] Sep. 22, 1981

[54] ACTUATING DEVICE FOR THE ADVANCEMENT OF THE TAPE IN A CASSETTE-TYPE TAPE RECORDING/PLAYBACK APPARATUS

[75] Inventor: Vittorio Pera, Rome, Italy

[73] Assignee: Autovox S.p.A., Rome, Italy

[21] Appl. No.: 51,098

[22] Filed: Jun. 22, 1979

[30] Foreign Application Priority Data

Jun. 27, 1978 [IT] Italy .............................. 50036 A/78

[51] Int. Cl.³ ............................................. G11B 15/26
[52] U.S. Cl. .................................. 360/96.4; 360/96.2; 242/197
[58] Field of Search ................... 360/96.4, 96.1, 96.2, 360/96.3, 93; 242/197-202

[56] References Cited

U.S. PATENT DOCUMENTS

| | | | |
|---|---|---|---|
| 3,767,137 | 10/1973 | Richt | 360/96.4 |
| 3,781,019 | 12/1973 | Kikuchi | 360/96.2 |
| 4,010,493 | 3/1977 | Cicatelli | 360/96.4 |
| 4,101,941 | 7/1978 | Tanaka | 360/96.4 |

Primary Examiner—Alfred H. Eddleman
Attorney, Agent, or Firm—Ladas & Parry

[57] ABSTRACT

A cassette-type tape recording/playback apparatus comprising two flywheels driven by a motor, which rotate in opposite directions, each of the flywheels having a capstan integral and coaxial with it, each capstan regulating respectively the speed of advancement of the tape in one or in the other direction by effect of the pressure exerted by a respective pressure roller against the tape which is pushed against the capstan by the pressure roller.

10 Claims, 7 Drawing Figures

ACTUATING DEVICE FOR THE ADVANCEMENT OF THE TAPE IN A CASSETTE-TYPE TAPE RECORDING/PLAYBACK APPARATUS

The present invention relates to an actuating device for the advancement of the tape in a cassette-type tape recording/playback apparatus, of the type in which the scanning or reading of the tape by the recording/playback magnetic head takes place during the advancement of the tape both in one direction and in the opposite direction of the advancement of the tape.

More particularly the present invention relates to cassette-type tape recording/playback apparatus comprising two flywheels driven by a motor, which rotate in opposite directions, each of the flywheels having a capstan integral and coaxial with it, each capstan regulating respectively the speed of advancement of the tape in one or in the other direction by effect of the pressure exerted by a respective pressure roller against the tape which is pushed against the capstan by the pressure roller.

The invention is particularly apt for use with recording/playback apparatus of the so-called "auto-reverse" type, in which, when the tape is completely unwound from the reel, the apparatus reverses automatically the direction of advancement of the tape so that the magnetic head may scan the second track of the tape, without the need of stopping the apparatus, extracting the cassette and turning it over with respect to its previous position.

Therefore, an object of the invention is providing an actuating device for the reversal of the advancement of the tape.

Another object of the invention is providing a mechanism which permits the changing of the speed of advancement of the tape, from its normal speed to the rapid winding speed, in an extremely simple manner and in both directions.

The present invention realizes the above-indicated objects by means of a device which utilizes a minimum of component parts, disposed in an extremely compact arrangement, with high reliability and efficiency of operation.

According to the present invention, an actuating device for the advancement of the tape in a cassette-type tape recording/playback apparatus, of the type having a frame, two counter-rotating flywheels driven by a motor through a belt transmission, two capstans each of which is integral and coaxial with one of the flywheels, a pressure roller for each of the capstans, two hub-carrying disks, each one driven by a friction wheel, rotatable about a pin fixed onto the frame, is characterized by the fact that is comprises: a guide element pivotally connected to the frame, apt to assume a first or a second set position under the control of a rocker member and apt to guide said rocker member toward a first or a second control position depending on said first or second set position of said guide element, so as to control the advancement of the magnetic tape in one direction or in the opposite direction.

According to another aspect of this invention, an actuating device comprises a frame, two counter-rotating flywheels driven by a belt transmission actuated by an electric motor, each of said flywheels being provided with a capstan integral and coaxial with it, a pressure roller for each capstan, two hub-carrying disks apt to receive the reels of the cassette, each disk being driven by a friction wheel rotatable about a pin secured to the frame, said elements, which are per se known, being disposed on the plane of the frame on one side and the other of a center axis equidistant from the axes of rotation of the two flywheels and also equidistant from the axes of rotation of the disks, the device according to the invention being characterized by the fact of comprising: a slide constrained onto the frame so as to be able to translate in a parallel manner with respect to the center axis so as to assume alternatively an operative position and a rest position and urged by return springs toward the rest position; unidirectional motion transmitting means, which transmit the motion of a flywheel to the slide when it is in the rest position, to effect its translation toward the operative position, against the action of said return springs; a latch apt to hold said slide in the operative position, and to free said slide under an unlocking control signal to cause said slide to return to the rest position under the action of said return springs; two rocking levers, each freely hinged on the pin of each disk, each rocking lever rotatably supporting, in a fixed position, spaced from said pin, a pulley integral with a sprocket wheel, each rocking lever being able to effect an angular displacement such as to engage or disengage in entrainment said pulley with or from the flywheel which is located on its same side with respect to the center axis to effect or interrupt an entrainment contact with it, said sprocket wheel being in constant entraining engagement with said friction wheel, each rocking lever having an elastic ledge on the side opposite to said pulley with respect to said pin and being urged toward the disengagement position by spring means; an oscillating guide apt to effect an angular displacement between two set positions around a pivot integral to the frame, located on the center axis; a rocker member swinging about a pin secured to said slide and having an end apt to follow the profile of said guide and to push it toward its other set position, and having also two fingers each engageable with either of said elastic ledges of said rocking levers, depending on the position assumed by said guide, said rocker member having additionally thereon two legs, each engageable with either of the two pressure roller supports, depending on the position assumed by said guide; a magnetic head arm rotatably connected to the slide at one end and elastically connected to the slide at the other end so as to be elastically urged toward a position of engagement with the magnetic tape, of the recording/playback magnetic head secured to said magnetic head arm; two pressure roller supports rotatably connected with said slide, each of which rotatably supports a pressure roller, and urged elastically toward the respective capstan, said supports having a profiled end comprising an abutment for one of the legs of the rocker member so as to prevent, depending on the angular position assumed by the rocker member, an engagement of the pressure roller carried by the respective support, with the respective capstan, whereby, with the guide disposed in a first of its two set positions, the translation of the slide toward its operative position causes the rocker member to angularly move in the direction which results from following the profile of said guide and at the same time said guide be pushed in its second set position, said rocker member coming into engagement with the elastic ledge of either rocking lever, depending on said first set position of said guide, thus angularly displacing said lever, bringing the respective pulley into engagement with the respective flywheel and effecting the rotation of said friction wheel, as at the same time said translating slide actuates the magnetic head arm bringing a pressure roller into engagement with the respective capstan and maintaining the other pressure roller disengaged from its capstan, depending on the direction of rotation effected by said rocking member, so as to entrain and wind up the tape in one of its two directions of advancement, while a return of the slide in its rest position and a further translation of the slide toward the operative position, causes the magnetic tape to be advanced and wound in the direction opposite to the preceding one, depending on said second set position of the guide, and the winding of the magnetic tape at a fast speed is obtained by rotating the magnetic head arm against the action of its return spring, in the operative position of said slide.

Therefore, as described above, for each translation of the slide from the rest position to the operative position, the rocker member is forced to effect an angular displacement in a determined direction because of the set position assumed by said guide, and the rocker member itself effects the displacement of said guide into the other set position as a result of said angular movement, so that a successive translation of the slide toward its operative position passing through its rest position, determines an angular displacement of the rocker member in a direction opposite to the preceding one, thus activating the mechanisms which operate the reversal of the direction of advancement of the tape.

The present invention will be better understood by making reference to the attached drawings, in which.

Figure 1:
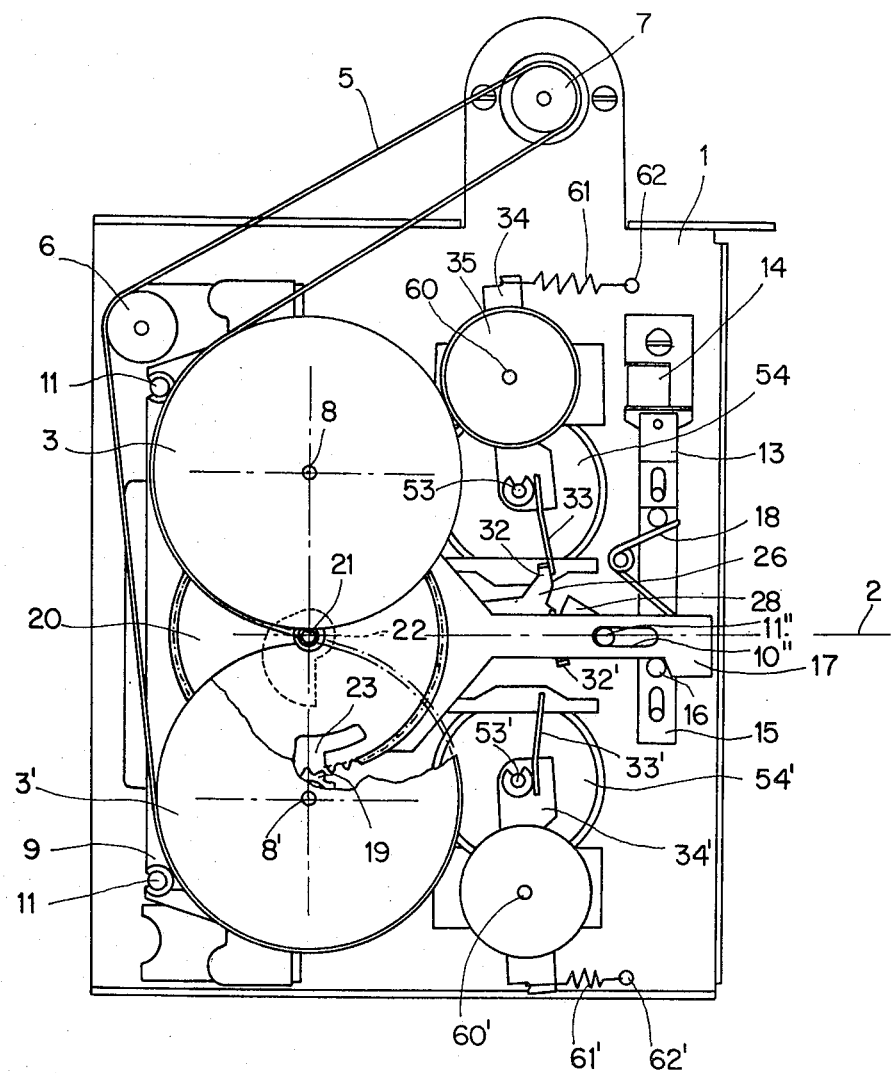
FIG. 1 is a bottom view of a device according to the invention.
Figure 2:
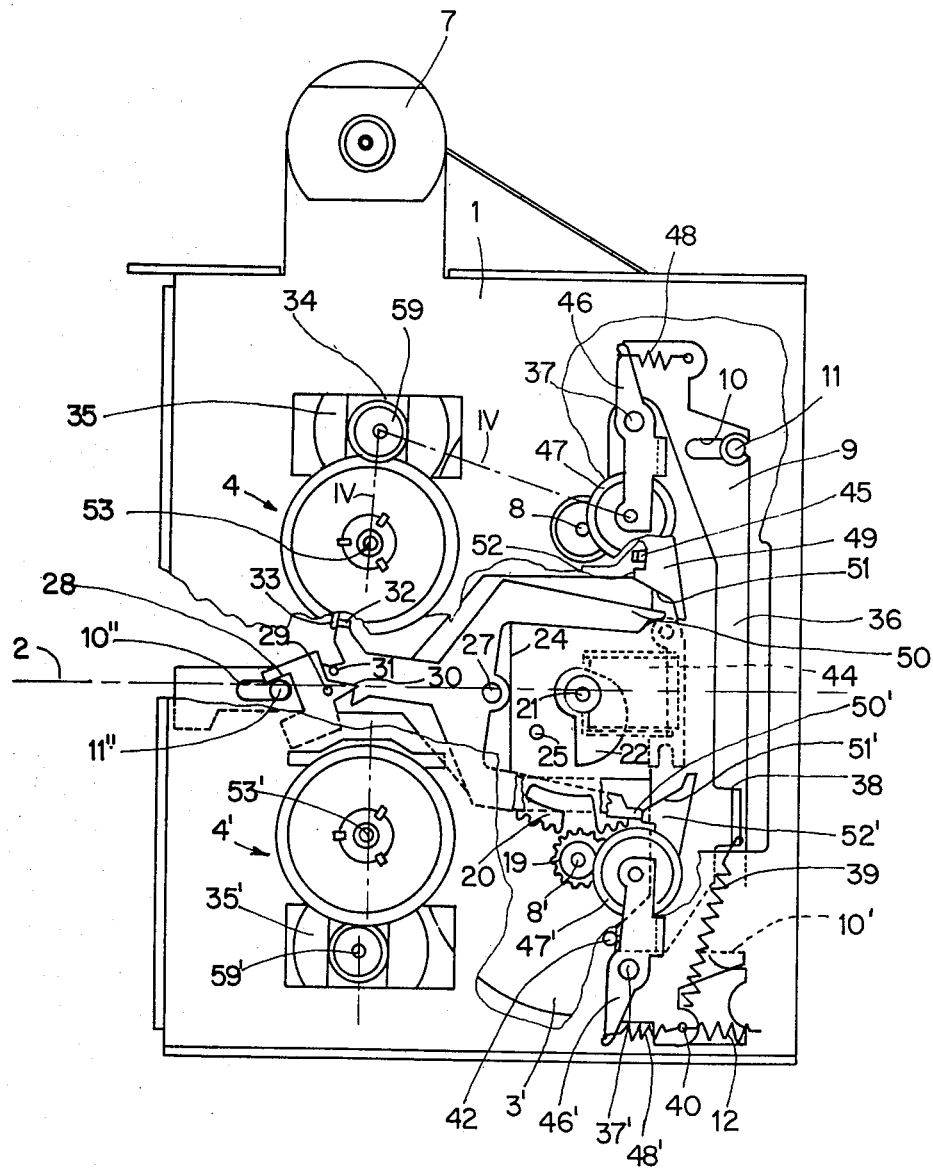
FIG. 2 is a top view of the device according to FIG. 1.

With reference to FIGS. 1 and 2, the frame of the recording/plackback apparatus is indicated with the numeral 1. The frame 1 comprises a substantially flat portion, the lower face of which can be seen in FIG. 1 and the upper face of which can be seen in FIG. 2. On said flat portion of the frame 1, which will hereinafter be referred to as "frame" for the sake of simplicity, a central axis 2 is equidistant from the rotational axes of the counter-rotating flywheels 3,3' and of the hub-carrying disks 4,4'. The flywheels 3,3' are rotationally driven through a belt 5 and a pulley 6 by an electric motor 7, so as to effect their rotation in opposite directions at the same speed. Each flywheel carries, integral and coaxial with it, a capstan, respectively 8 and 8', which capstans rotate, in a manner well known, at the same speed and in opposite directions.

Figure 3:
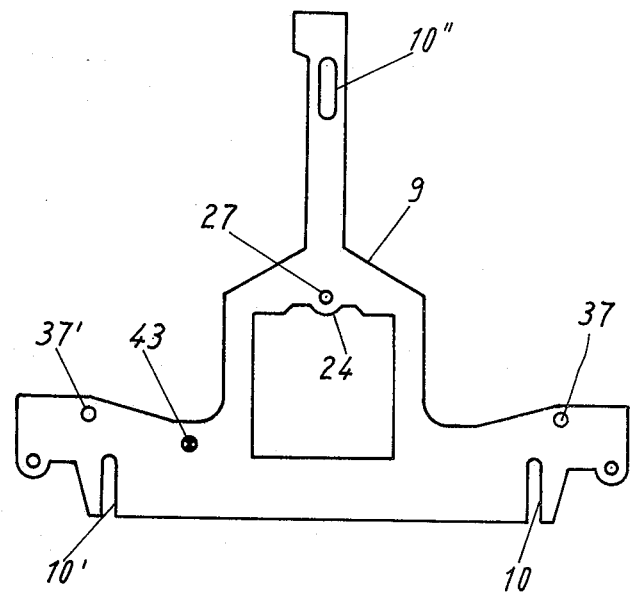
FIG. 3 shows the slide.

According to the present invention, a slide 9 is constrained onto the frame as to effect a translatory movement parallel to the center axis 2 by means of slots 10, 10', 10" coacting with respective pins 11, 11', 11" secured to the frame. The preferred form of the slide is illustrated in FIG. 3. The slide 9 may thus assume two positions, an operative position, as illustrated in FIGS. 1 and 2, and a rest position (not shown) in which the slide 9 is translated toward left, looking at FIG. 1, and toward right, looking at FIG. 2, respectively. Two springs 12 (only one of which is shown in FIG. 2) urge the slide toward the rest position, so that, in the operative position, the springs 12 are stressed. The slide is maintained in its operative position by a latch or locking device 13 consisting of a holding electromagnet 14 and a slidable bar 15 having a stop 16 thereon apt to engage a prong 17 located on the upper section of an extension of the slide 9. As long as the holding electromagnet 14 is energized, the bar 15 is maintained into a locked engagement with the slide; when the electromagnet 14 becomes de-energized, the bar 15 is caused to slide axially under the action of a spring 18, the prong 17 of the slide 9 is disengaged and the slide is driven back to its rest position by the prestressed springs 12.

The mechanism which effects the translation of slide 9 from its rest position to its operative position may be any type of unidirectional mechanism, the preferred mechanism according to the invention being the following:

a sprocket wheel 19 is rigidly connected to one of the flywheels (flywheel 3' in the example shown in FIG. 2) and thus rotates constantly in an integral manner with flywheel 3'. A toothed or serrated wheel 20 is pivotally connected to a shaft 21 fixed on the frame at the center axis and to said toothed wheel 20 is rigidly connected a cam 22 which rotates around the same shaft 21.

The toothed wheel 20 has a portion of its perimeter (indicated in 23) free of teeth, so that the meshing engagement between the toothed wheel 20 and the sprocket wheel 19 is interrupted where that portion 23, devoid of teeth, is placed in front of the sprocket wheel 19. This condition occurs when the slide 9 is placed in its operative position. When the slide 9 returns to its rest position, the upper side 24 (FIG. 3) of a slot cut into the slide 9, comes into contact with a boss 25 integral with the toothed wheel 20, so that the latter effects a rotational movement around the shaft 21 bringing its toothed section back into engagement with the continuously rotating sprocket wheel 19. In this manner the wheel 25 effects a one turn rotation and the profiled cam 22 comes into contact with said side 24 of the slotl of the slide 9, which results in the translation of the slide 9 from its rest position to its operative position, where it is locked by the latch 13. After this operation has been executed, the toothed wheel 20 stops when its toothed section looses the meshing engagement with the sprocket wheel 19.

Figure 5:
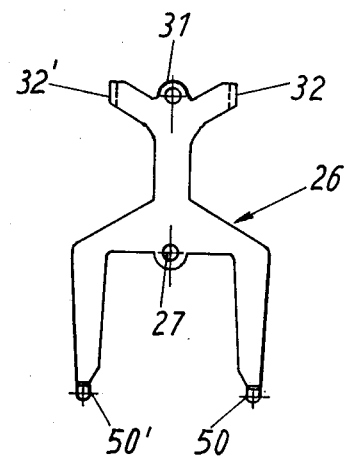
FIG. 5 shows the rocker member.

A rocker member 26 is connected to the slide 9, in a freely rotatable manner around a pivot pin 27. The rocker member 26 is shown in better detail in FIG. 5. The rocker member 26 is therefore driven by the slide 9 during its translation.

A guide 28 is pivotally connected to the frame 1 by means of a pivot 29. In particular, the pivot 29 may be secured onto the lower section of the frame 1. The guide 28 may oscillate around pivot 29 assuming two extreme set positions limited by abutment on the pin 11" secured onto the frame.

The guide 28 is provided with a profiled point 30 which, in the two set positions of the guide 28, locates on one side or on the other of the center axis 2 respectively. The guide 28 is preferably connected by means of a friction or clutch to the pivot 29, so as to maintain the set position assumed, as long as the rocker member 26 does not forcibly displace it, as will be hereinafter described.

The rocker member 26 has on the upper section thereof a cam-following head 31 and two operating fingers 32, 32', respectively on one side and on the other side of said head 31 and, in the rest position of the slide 9, two stops (not shown) fixed onto the frame 1, keep the rocker member with its axis of symmetry aligned with the central axis. When the axis 2 is placed in one of its set positions, for example with its profiled point 30 on the lower side of the central axis 2 (as viewed in FIG. 2), the rocker member 26, which was initially with its axis of symmetry aligned with the central axis 2, is driven toward left by the translation of the slide 9. The cam-following head 31 will come into contact first with the upper section (still as viewed in FIG. 2) of the profiled point 30 and will begin to move following the profile of said point and then inclining itself upwardly with respect to the central axis 2. Furthermore, on following the profile of the point 30, the head 31 is offset with respect to the pivot 29, whereby the guide 28 is forced to rotate assuming its other set position. At the same time, the operating finger 32 of the rocker member 26 comes into contact with the elastic ledge 33 of a rocking lever 34 (see FIG. 1) forcing said rocking lever 34 to effect an angular displacement around its pin 53 so as to bring a pulley 35, freely rotatable on said rocking lever 34, into contact with the perimeter of the flywheel 3, for the rotational drive of the hub-carrying disk, which will be described hereinafter.

Figure 6:
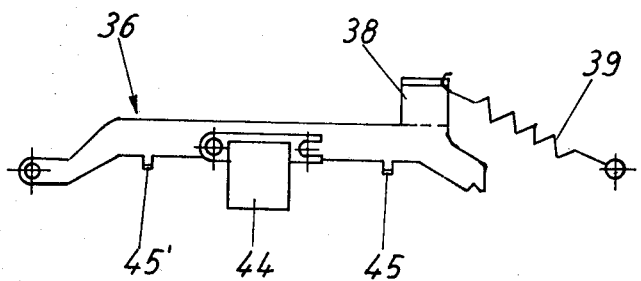
FIG. 6 shows the magnetic head arm.

A magnetic head arm indicated with 36 and shown in detail in FIG. 6 is pivotally mounted on a pin 37 fixed onto the slide 9. The magnetic head arm is provided with a spring seat 38 on the opposite side with respect to the pin 37, into which spring seat 38 there is fixed an end of a spring 39, the other end of which is fixed at 40 to the slide 9. In the operative position of the slide 9, shown in FIG. 2, the end 41 of the magnetic head arm 36 rests against a boss 42 fixed onto the frame, while during the return run to the rest position of the slide 9, a boss 43 fixed onto the slide 9 permits driving the magnetic head arm 36 during the translation of the slide 9 toward its rest position. The magnetic head arm 36 carries, secured to it, a recording/playback magnetic head 44, in a well known manner, and is also provided with two hooks 45, 45', for the reason which will be hereinafter described.

Therefore, the magnetic head arm 36 is normally urged by the tension spring 39, toward the boss 43 integral to the slide, so that the magnetic head arm may substantially move integrally with the slide 9, but may be rotated with respect of the same by pulling downwardly the seat 38 against the tension of the spring 39, in order to move away the magnetic head from the tape, for the reason which will be described hereinafter.

The slide 9 additionally carries, in a freely rotatable manner, two support arms or supports 46, 46' for the pressure rollers 47, 47'. In the illustrated embodiment, said support arms 46, 46' are pivotally connected respectively on pivot pin 37 of the magnetic head arm 36 and on a pin 37' and are urged by tension springs, respectively 48, 48', toward the position which engages pressure rollers 47, 47' with the respective capstans 8, 8'. The supports 46, 46' have thereon extensions 49, 49' which may engage the hooks 45, 45' of the magnetic head arm 36 so as to limit their displacement toward the left with respect to the magnetic head arm 36.

The extensions 49, 49' of the supports 46, 46' are cam-shaped so that, in the rest position of the slide 9, with the rocker member disposed symmetrically with respect to the central axis 2, the legs 50, 50' of the rocker member may rest on the cam-shaped section, indicated with 51, 51', of the extensions 49, 49'

During the translational movement of the slide 9 with a simultaneous angular displacement of the rocker member 26, with reference to FIG. 2, the leg 50' of the rocker member 26 rides onto the cam-shaped part 51' until it rides over a rising portion 52' of the extension 41'. The engagement of the leg 50' on the rising portion 52' prevents the spring 48' from pushing the pressure roller 47' carried by the arm 46' against the respective capstan 8', while, since the leg 50 of the rocker member remains free from engagement with the cam-shaped section 51 and the rising portion 52 of the extension 49, the spring 48 may push the pressure roller 47 mounted on support 46 against the respective capstan 8.

Under this condition, illustrated in FIGS. 1 and 2, since, in a manner already known, the magnetic tape passes freely between the pressure roller 47' and the capstan 8', in front of the magnetic head 44 and in engagement between the capstan 8 and the pressure roller 47, the speed of the tape is controlled by the steady peripheral speed of the capstan 8 and the direction of the speed of the tape is controlled by the constant direction of rotation of the capstan 8.

Figure 7:
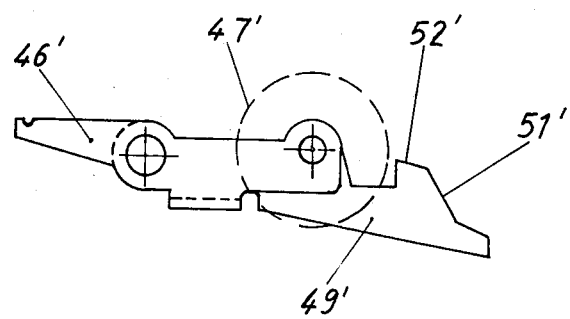
FIG. 7 shows a pressure roller support.

In FIG. 7 there is shown in a clearer manner one of the supports, for example, the support 46'.

Figure 4:
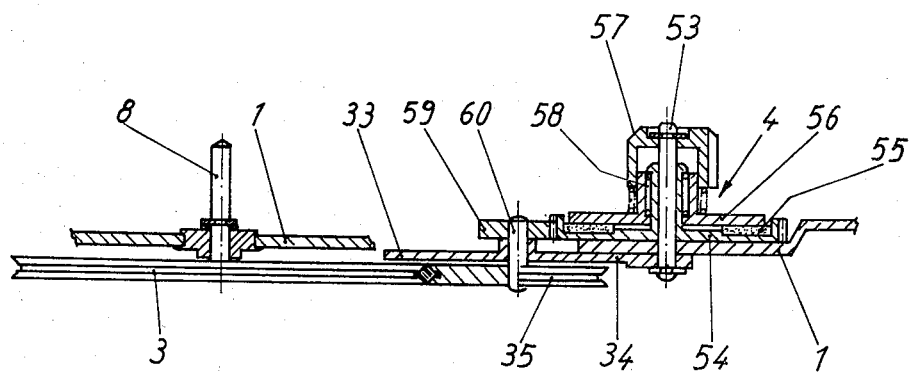
FIG. 4 is an irregular section taken along line IV—IV of FIG. 2.

There will now be described the transmission of the motion from the flywheel to the disk for the winding of the tape, with particular reference to FIGS. 1 and 4.

As has already been noted, a rocking lever 34 and a corresponding rocking lever 34' are connected in a freely rotatable manner on the pins 53, 53' of the hub-carrying disks 4, 4'.

In a manner already known, each disk is formed by a wheel 54 driven by the mechanism for the winding of the tape, a friction element 55, a hub-carrying disk 56 and a hood 57. A spring 58 pushes the hub-carrying disk 56 against the friction element 55, so that the hood 57, which is engaged with the reel of tape, may rotate at a speed different than that of the wheel 54.

In a preferred embodiment of the present invention, the wheel 54 is a toothed wheel which is constantly meshed with a sprocket wheel 59 which is rigidly connected to a shaft 60, which can freely rotate in the rocking lever 34. The shaft 60 is also rigidly connected to the aforementioned pulley 35, which may come into peripheral contact with the periphery of the flywheel 3.

Obviously the same arrangement applies also to disk 4'.

Therefore, when the operating finger 32 pushes on the elastic ledge 33 of the rocking lever 34, the pulley 35 is brought, against the action of a spring 61 which operates under tension between the rocking lever 34 and a seat 62 fixed onto the frame, onto the periphery of the flywheel 8 and is rotationally driven by friction contact with the same. The rotation of the pulley 35 is transmitted through the shaft 60 to the sprocket wheel 59, which results in the rotation of the toothed wheel 54 to effect the winding of the tape.

The operation of the apparatus, which results obviously from the preceding specification, will now be summarized for the sake of clarity.

When the motor is shut down, the slide will be placed in the rest position, since the latch 13 is unlocked by the disenergization of the electromagnet 14. The start-up of the motor produces the rotation of the flywheels 3, 3' and thus also produces the rotation of the sprocket wheel 19, which operates the rotation of the toothed wheel 20 and the cam 22, which results in the translation of the slide 9 toward the operative position and at the same time the tilting of the rocker member 26 in a determinate direction depending on the set position in which the guide 28 is found. Therefore the movement of the rocker member 26 will effect the following operations:

(1) displacement of the guide 28 into its other set position;

(2) displacement of a rocking lever so as to put into rotation its respective disk;

(3) engagement of a leg of the rocker member with the support of the pressure roller which is located on the side opposite to the center line with respect to the disk put into rotation, so as not to engage that pressure roller with the respective capstan;

(4) disengagement from the support of the pressure roller of the other leg of the rocker member which is located on the same side with respect to the center axis as the disk driven by the flywheel is, which pressure roller may thus engage the respective capstan and control the speed of the tape wound by the disk.

The other disk is simply driven by the tape which unwinds from its reel.

In this situation the latch 13 is always held in a locked position for the prong 17 of the slide.

When it is wished to reverse the direction of advancement of the tape, or when the reel is empty and it is wished to reverse the direction of advancement of the tape to scan the other track of the tape, an electric signal disenergizes the electromagnet 14 which was holding the latch 13 and the slide is brought back to the rest position by the springs 12.

In this situation the rocker member is placed again symmetrically with respect to the central axis 2 and the magnetic head arm is driven by the slide together with the pressure roller supports.

The return of the slide to the rest position brings the toothed wheel 20 back into engagement with the sprocket wheel 19 and the operations described before are repeated, except that the rocker member moves angularly in a direction opposite to the preceding one, since it will now find the guide 28 in its set position opposite to the preceding one.

Therefore, the operations are reversed with respect to the center axis 2 and the tape is entrained in its other direction of rotation.

The device of the present invention permits also, in an extremely easy manner, to vary the degree of the speed of the tape from the normal advancement speed determined by the capstans 8, 8' to a fast winding speed.

To this end, when the slide is placed in its operative position, an operation which causes the rotation of the magnetic head arm around the pivot pin 37 against the return action of spring 39 will be sufficient, thus entraining in the rotation the supports 46, 46' by action of the hooks 45, 45', in order to disengage the pressure roller engaged with the respective capstan and leave the tape free to reach the winding speed imposed by the transmission flywheel-pulley-sprocket wheel-toothed wheel-friction element, without the tape being restrained by the capstan.

When the magnetic head arm 36 returns to the normal position, the tape is again engaged between the pressure roller and the capstan and recovers its normal speed of advancement.

While the present invention has been described in considerable detail, it is understood that it may be modified without, however, departing from the scope of the same.

For example, the translational movement of the slide may be effected by means of any device which realizes the transmission of a unidirectional motion and the transmission connections which have been described as meshing or friction engagements, may be embodied in different manners.

What is claimed is:

1. An actuating device for the advancement of the tape in cassette-type tape recording/playback apparatus of the type having a frame, two counter-rotating flywheels driven by a motor through a belt transmission, two capstans each of which is integral and coaxial with one of the flywheels, a pressure roller for each of the capstans, two hub-carrying disks, each driven by a friction wheel, rotatable about a pin fixed onto the frame, and there being defined on said plane of the frame a central axis equidistant from the axes of rotation of the two flywheels and equidistant from the axes of rotation of the two disks, which device is characterized by the fact of comprising: a slide constrained onto the frame so as to be able to translate in a parallel manner with respect to the center axis so as to assume alternatively an operative position and a rest position and urged by return springs toward the rest position; unidirectional motion transmitting means, which transmit the motion of a flywheel to the slide when it is in the rest position, to effect its translation toward the operative position, against the action of said return springs; a latch apt to hold said slide in the operative position, and to free said slide under an unlocking control signal to cause said slide to return to the rest position under the action of said return springs; two rocking levers, each freely hinged on the pin of each disk, each rocking lever rotatably supporting, in a fixed position, spaced from said pin, a pulley integral with a sprocket wheel, each rocking lever being able to effect an angular displacement such as to engage or disengage in entrainment said pulley with or from the flywheel which is located on its same side with respect to the center axis to effect or interrupt an entrainment contact with it, said sprocket wheel being in constant entraining engagement with said friction wheel, each rocking lever having an elastic ledge on the side opposite to said pulley with respect to said pin and being urged toward the disengagement position by spring means; an oscillating guide apt to effect an angular displacement between two set positions around a pivot integral to the frame, located on the center axis; a rocker member swinging about a pin secured to said slide and having an end apt to follow the profile of said guide and to push it toward its other set position, and having also two fingers each engageable with either of said elastic ledges of said rocking levers, depending on the position assumed by said guide, said rocker member having additionally thereon two legs, each engageable with either of the two pressure roller supports, depending on the position assumed by said guide; a magnetic head arm rotatably connected to the slide at one end and elastically connected to the slide at the other end so as to be elastically urged toward a position of engagement with the magnetic tape, of the recording/playback magnetic head secured to said magnetic head arm; two pressure roller supports rotatably connected with said slide, each of which rotatably supports a pressure roller, and urged elastically toward the respective capstan, said supports having a profiled end comprising an abutment for one of the legs of the rocker member so as to prevent, depending on the angular position assumed by the rocker member, an engagement of the pressure roller carried by the respective support, with the respective capstan, whereby, with the guide disposed in a first of its two set positions, the translation of the slide toward its operative position causes the rocker member to angularly move in the direction which results from following the profile of said guide and at the same time said guide be pushed in its second set position, said rocker member coming into engagement with the elastic ledge of either rocking lever, depending on said first set position of said guide, thus angularly displacing said lever, bringing the respective pulley into engagement with the respective flywheel and effecting the rotation of said friction wheel, as at the same time said translating slide actuates the magnetic head arm bringing a pressure roller into engagement with the respective capstan and maintaining the other pressure roller disengaged from its capstan, depending on the direction of rotation effected by said rocking member, so as to entrain and wind up the tape in one of its two directions of advancement, while a return of the slide in its rest position and a further translation of the slide toward the operative position, causes the magnetic tape to be advanced and wound in the direction opposite to the preceding one, depending on said second set position of the guide, and the winding of the magnetic tape at a fast speed is obtained by rotating the magnetic head arm against the action of its return spring, in the operative position of said slide.

2. Actuating device according to claim 1, in which said unidirectional motion transmitting means comprise: a toothed wheel rotatable about a pivot pin secured to the frame and positioned on said central axis, said toothed wheel having a portion of its perimeter free of teeth and an abutment engageable with the slide during its return movement toward the rest position; a cam integral and concentric with said toothed wheel; a sprocket wheel integral and concentric with one of the flywheels and in driving engagement with said toothed wheel, for transmitting the rotation of the flywheel to said cam, whereby said cam during its rotation effects the slide translation from its rest position to its operative position, until the peripheric portion of said toothed wheel free of teeth disengages from the sprocket wheel when the slide is in the operative position, said abutment of the toothed wheel being engaged by said slide during its return movement toward the rest position, to bring the serrated section of the toothed wheel back into engagement with that of the sprocket wheel.

3. Actuating device according to claim 1, in which said oscillating guide is frictionally connected with its pivot.

4. Actuating device according to claim 1, in which said slide is translationally constrained onto the frame in three points by means of slot-pin connections.

5. Actuating device according to claim 1, in which the latch comprises a locking element controlled by a holding electromagnet.

6. Actuating device according to claim 1, in which the driving engagement between the pulley carried by the rocking lever and the flywheel is effected by friction contact.

7. Actuating device according to claim 1 comprising bosses secured to the frame, which, during the return translation of the slide bring back the rocker member with its axis of symmetry aligned with said central axis.

8. Actuating device according to claim 1 comprising a boss secured to the frame, which determines the position of the magnetic head arm in the operative position of the slide, and bosses secured to the slide which determine, in the return of the slide toward the rest position, the position of the magnetic head arm.

9. Actuating device according to claim 1, in which said magnetic head arm is provided with hooks on which the pressure roller supports can rest and one of said pressure roller supports is pivotally connected on the same pin on which the magnetic head arm is pivotally connected.

10. Actuating device according to any of the preceding claims, 1 through 10 in which said pressure roller supports are provided with extensions profiled to guide the legs of said rocker member.

* * * * *

UNITED STATES PATENT AND TRADEMARK OFFICE
CERTIFICATE OF CORRECTION

PATENT NO. : 4291348

DATED : September 22, 1981

INVENTOR(S) : Vittoria Pera

It is certified that error appears in the above—identified patent and that said Letters Patent is hereby corrected as shown below:

Column 10, line 38, change 1 through 10 to "2 through 9".

Signed and Sealed this

Fifteenth Day of December 1981

[SEAL]

Attest:

GERALD J. MOSSINGHOFF

*Attesting Officer* — *Commissioner of Patents and Trademarks*